US012767111B2

(12) United States Patent
Bechmann

(10) Patent No.: US 12,767,111 B2
(45) Date of Patent: Oct. 20, 2026

(54) HYDRAULIC ARRANGEMENT, DIAGNOSTIC METHOD, AND BRAKE SYSTEM

(71) Applicant: ZF Active Safety GmbH, Koblenz (DE)

(72) Inventor: Roman Bechmann, Koblenz (DE)

(73) Assignee: ZF Active Safety GmbH, Koblenz (DE)

( * ) Notice: Subject to any disclaimer, the term of this patent is extended or adjusted under 35 U.S.C. 154(b) by 448 days.

(21) Appl. No.: 17/954,401

(22) Filed: Sep. 28, 2022

(65) Prior Publication Data

US 2023/0097781 A1 Mar. 30, 2023

(30) Foreign Application Priority Data

Sep. 29, 2021 (DE) ........................ 102021125284.9

(51) Int. Cl.

| | |
|---|---|
| ***B60T 13/74*** | (2006.01) |
| ***B60T 8/40*** | (2006.01) |
| ***B60T 13/14*** | (2006.01) |
| ***B60T 13/62*** | (2006.01) |
| ***B60T 13/68*** | (2006.01) |
| ***B60T 17/22*** | (2006.01) |

(52) U.S. Cl.

CPC ............ *B60T 17/22* (2013.01); *B60T 8/4081* (2013.01); *B60T 13/142* (2013.01); *B60T 13/62* (2013.01); *B60T 13/686* (2013.01); *B60T 2270/88* (2013.01)

(58) Field of Classification Search

CPC ....... B60T 13/745; B60T 13/686; B60T 11/26

See application file for complete search history.

(56) References Cited

U.S. PATENT DOCUMENTS

| | | | | |
|---|---|---|---|---|
| 10,059,321 | B2 | 8/2018 | van Zanten et al. | |
| 10,369,979 | B2 * | 8/2019 | Leiber | B60T 8/4081 |
| 11,332,108 | B2 * | 5/2022 | Albert | B60T 17/222 |
| 12,109,998 | B2 * | 10/2024 | Van Zanten | B60T 13/145 |
| 12,139,111 | B2 * | 11/2024 | Tarandek | B60T 17/22 |
| 2012/0169112 | A1 * | 7/2012 | Jungbecker | B60T 8/4081 303/9.75 |
| 2014/0203626 | A1 * | 7/2014 | Biller | B60T 7/02 303/14 |

(Continued)

FOREIGN PATENT DOCUMENTS

| | | | |
|---|---|---|---|
| DE | 102016206453 | A1 | 10/2017 |
| EP | 3204271 | B1 | 6/2018 |

*Primary Examiner* — Bradley T King

(74) *Attorney, Agent, or Firm* — Kristin L. Murphy

(57) ABSTRACT

A hydraulic arrangement for a brake system is disclosed. The hydraulic arrangement comprises a pressure-providing device, a reservoir for storing a pressure medium and a bleed line. The pressure-providing device has at least one pressure chamber which can be connected to a brake circuit. The reservoir has a first partial reservoir, which can be connected via a first reservoir line to a first pressure chamber of a piston-cylinder arrangement. The first pressure chamber of the piston-cylinder arrangement is delimited by a piston, which can be adjusted by an actuating device. The bleed line connects a bleed outlet of the pressure-providing device to the first reservoir line. A diagnostic method and brake system are also disclosed.

12 Claims, 3 Drawing Sheets

(56) References Cited

U.S. PATENT DOCUMENTS

| | | | | |
|---|---|---|---|---|
| 2014/0354036 | A1* | 12/2014 | Koo | B60T 8/4081 303/6.01 |
| 2016/0200307 | A1* | 7/2016 | Feigel | B60T 13/588 303/6.01 |
| 2017/0096130 | A1* | 4/2017 | Drumm | B60T 8/4081 |
| 2018/0215366 | A1* | 8/2018 | Leiber | B60T 8/4022 |
| 2018/0334148 | A1* | 11/2018 | Feigel | B60T 13/662 |
| 2019/0225205 | A1* | 7/2019 | Ganzel | B60T 13/745 |
| 2020/0298807 | A1* | 9/2020 | Ganzel | B60T 13/146 |
| 2020/0307538 | A1* | 10/2020 | Ganzel | B60T 8/4081 |
| 2020/0331442 | A1* | 10/2020 | Cheon | B60T 7/042 |
| 2020/0339086 | A1* | 10/2020 | Grimm | B60T 8/326 |
| 2021/0053547 | A1* | 2/2021 | Ganzel | G01F 23/74 |
| 2021/0155215 | A1* | 5/2021 | Ganzel | B60T 11/20 |
| 2021/0188232 | A1* | 6/2021 | Mayr | B60T 8/4081 |
| 2021/0188237 | A1* | 6/2021 | Zimmermann | B60T 8/326 |
| 2021/0261109 | A1* | 8/2021 | Ganzel | B60T 7/042 |
| 2022/0105914 | A1* | 4/2022 | Leiber | B60T 13/686 |
| 2022/0144240 | A1* | 5/2022 | Huff | B60T 13/146 |
| 2022/0153250 | A1* | 5/2022 | Park | B60T 8/4009 |
| 2022/0274576 | A1* | 9/2022 | Ganzel | B60T 7/042 |
| 2023/0027578 | A1* | 1/2023 | Seol | B60T 17/22 |
| 2024/0174207 | A1* | 5/2024 | Yang | B60T 8/172 |

* cited by examiner

HYDRAULIC ARRANGEMENT, DIAGNOSTIC METHOD, AND BRAKE SYSTEM

CROSS-REFERENCE TO RELATED APPLICATION

This application claims priority to German Patent Application No. 102021125284.9, filed Sep. 29, 2021, the disclosure of which is incorporated herein by reference in its entirety.

TECHNICAL FIELD

The disclosure relates to a hydraulic arrangement for a brake system and to a brake system. Furthermore, the disclosure relates to a diagnostic method for identifying a leak in a valve.

BACKGROUND

Vehicles usually have hydraulic brake systems by which the vehicle can be slowed down and stopped. During a journey, a brake must be constantly bled on account of rising temperatures and expanding brake fluid. For this purpose, known brake systems have bleed paths. In the event of a leakage fault, however, fluid may drain from the brake fluid reservoir and an additional pressure-providing device, such as a brake booster. Furthermore, the functionality of valves cannot be tested. The result can be underbraking of the vehicle.

For example, EP 3 204 271 B1 describes a hydraulic safety system for a hydraulic brake system with a pressure-providing device, a reservoir and two non-return valves.

Furthermore, U.S. Pat. No. 10,059,321 B2 describes a diagnostic method for determining the tightness of a valve function which is carried out after the ending of a braking operation.

SUMMARY

What is needed is to structurally and/or functionally improve a hydraulic arrangement for a brake system mentioned at the outset. In addition, what is needed is to functionally improve a diagnostic method mentioned at the outset. Furthermore, what is needed is to structurally and/or functionally improve a brake system mentioned at the outset.

The object is achieved by a hydraulic arrangement having the features set forth in one or more of the claims. In addition, the object is achieved by a diagnostic method disclosed herein. Furthermore, the object is achieved by a brake system having the features disclosed herein. Advantageous embodiments and/or developments form the subject matter of the dependent claims.

A hydraulic arrangement is disclosed herein, which can be for a brake system. The hydraulic arrangement and/or the brake system can be used or be for a vehicle, such as a motor vehicle. The motor vehicle can be a passenger car or a heavy goods vehicle. The brake system can be a vehicle brake system and/or a motor vehicle brake system.

The hydraulic arrangement and/or the brake system can be designed to be actuated by a driver of the vehicle and/or independently of the driver. A braking operation initiated by a driver by the brake pedal may be referred to as a service braking. In the case of service braking, the hydraulic pressure in the brake circuits is generated by the driver, for example directly or indirectly by activation of a hydraulic pump. In the context of service braking initiated by the driver or independently thereof, a driving safety system and/or driving dynamics control system can bring about a braking operation, referred to as system braking, independently of the driver, for example by a pressure-providing device, such as a brake booster. The system braking can be superimposed in time on service braking or take place separately in time from service braking.

The hydraulic arrangement can have a pressure-providing device (DAP). The pressure-providing device can be a brake booster. The pressure-providing device can have at least one pressure chamber. The hydraulic arrangement can have a brake circuit. The hydraulic arrangement and/or the brake circuit can have a booster circuit. The at least one pressure chamber of the pressure-providing device can be connectable or connected to the brake circuit and/or booster circuit.

The hydraulic arrangement can have a reservoir for storing and/or holding a pressure medium, such as hydraulic fluid and/or brake fluid. The pressure medium can be for the brake system and/or the brake circuit. The pressure medium can be held and/or stored in the reservoir at atmospheric pressure or at other pressures. The reservoir can have at least one fluid level sensor for detecting the fluid level of the reservoir. The reservoir can be a fluid reservoir, such as hydraulic fluid reservoir and/or brake fluid reservoir. The reservoir can have a first partial reservoir. The reservoir can have a second partial reservoir. The reservoir can have a third partial reservoir. The partial reservoirs can be hydraulically connected to one another as far as a minimum filling level. The reservoir can have a plurality of partitions. The partitions can separate the partial reservoirs from one another. If the pressure medium falls below the minimum filling level, the individual partial reservoirs can be decoupled or separated from one another. This enables a single partial reservoir to be emptied, for example in the event of a leak. In this case, the other partial reservoirs can continue to be functional and/or can be or are hydraulically decoupled or separated by the partitions.

The first partial reservoir can be connectable or connected via a first reservoir line to a first pressure chamber of a piston-cylinder arrangement. The second partial reservoir can be connectable or connected via a second reservoir line to a second pressure chamber of the piston-cylinder arrangement. The third partial reservoir can be connectable or connected via a third reservoir line to the at least one pressure chamber, for example to a first pressure chamber, of the pressure-providing device. The third partial reservoir can be designed and/or used for the return of pressure medium, such as brake fluid, from at least one wheel brake and/or for the intake of pressure medium, such as brake fluid, by the pressure-providing device. The intake of pressure medium by the pressure-providing device can take place via the third reservoir line. A valve, such as a non-return valve, can be arranged in the third reservoir line, for example in such a way that the blocking side of the valve is connected in the direction of the third partial reservoir and its suction side is connected in the direction of the pressure-providing device.

The hydraulic arrangement can have the piston-cylinder arrangement. The piston-cylinder arrangement can be a brake cylinder, such as a brake master cylinder. The hydraulic arrangement can have an actuating device, for example a brake pedal device. The piston-cylinder arrangement can be actuable or actuated mechanically and/or electrically by the actuating device.

The piston-cylinder arrangement can have a first pressure chamber. The piston-cylinder arrangement can have a piston, such as a first piston and/or an input piston. The piston can be adjustable. The piston can be adjustable and/or actuable or can be adjusted and/or actuated by the actuating device. The first pressure chamber of the piston-cylinder arrangement can be delimited by the piston, such as the input piston.

The piston-cylinder arrangement can have a second pressure chamber. The piston-cylinder arrangement can have a further piston, such as a second piston and/or an output piston. The piston can be adjustable. The piston can be adjustable and/or actuable or can be adjusted and/or actuated by the actuating device and/or by the first piston, such as the input piston. The first pressure chamber of the piston-cylinder arrangement can be delimited by the first piston or input piston and the second piston or output piston. The second pressure chamber of the piston-cylinder arrangement can be delimited by the second piston or output piston.

The hydraulic arrangement can have a bleed line. The bleed line can connect a bleed outlet of the pressure-providing device to the first reservoir line, for example hydraulically and/or fluidically. The bleed line can be connected on the one hand to the bleed outlet and on the other hand to the reservoir line.

The lines, such as the bleed line, reservoir lines and/or the other lines mentioned above and/or below, can be hydraulic lines, for example hydraulics lines. The lines can be designed to carry the pressure medium.

A valve, for example a checking valve and/or non-return valve, can be arranged in the bleed line. The hydraulic arrangement can have this valve. This valve can be a non-return valve. The suction side of this valve can be connected in the direction of the first reservoir line and/or its blocking side can be connected in the direction of the bleed outlet. The suction side of the valve can be connected in the direction of the first pressure chamber of the piston-cylinder arrangement. The valve can be designed to allow an inflow and/or return flow of pressure medium into the first reservoir line. The valve can be designed to allow an inflow and/or return flow of pressure medium into the first partial reservoir and/or into the first pressure chamber of the piston-cylinder arrangement. The valve can be designed to block an inflow and/or return flow of pressure medium into the at least one pressure chamber, for example the second pressure chamber, of the pressure-providing device.

The hydraulic arrangement can have a switchable valve, for example, a switchable simulator test valve. This switchable valve can be arranged in the first reservoir line. The bleed line can open into a section of the first reservoir line which is arranged between the switchable valve and the first pressure chamber of the piston-cylinder arrangement. The switchable valve can be an electromagnetically actuable valve. The switchable valve can have a first section, which allows pressure medium to pass in both directions, and/or a second section with a non-return valve. The switchable valve can be designed to switch between the first and second sections.

The pressure-providing device can have a piston. The piston of the pressure-providing device can be of substantially T-shaped design. The piston of the pressure-providing device can be a plunger, for example a double-acting plunger. The pressure-providing device can be a pressure source. The piston or plunger of the pressure-providing device can supply a pressure medium, such as a brake fluid, during an axial movement in both directions. The brake circuit and/or booster circuit can provide an operative connection between the pressure-providing device and the wheel brakes. The pressure-providing device can have a drive, for example an electric motor. The piston of the pressure-providing device can be activated by the drive. The piston or plunger of the pressure-providing device can deliver a pressure medium, such as a brake fluid, both during a forward stroke and during a return stroke. An actuation of the wheel brakes can be provided in any position of the piston or plunger.

The piston of the pressure-providing device can be designed to connect the bleed outlet and/or the bleed line to the at least one pressure chamber of the pressure-providing device in one position, for example a rearward position, such as an end position. The pressure-providing device can have the bleed outlet. The bleed outlet and/or bleed line can be for the brake circuit. Bleeding, of the brake circuit for example, can take place by the bleed outlet and/or the bleed line. The pressure-providing device can have at least one seal, and in one exemplary arrangement, has two seals. The at least one seal can be a ring seal. The at least one seal can be in engagement, for example in a sealing and/or sliding manner, with the cylindrical outer surface of the piston of the pressure-providing device. The bleed outlet can be arranged, e.g. in the axial direction, between two seals, which are in engagement with the cylindrical outer surface of the piston of the pressure-providing device, for example.

The pressure-providing device can have a first pressure chamber and a second pressure chamber. The piston of the pressure-providing device can separate and/or delimit the first pressure chamber and the second pressure chamber from one another. The piston of the pressure-providing device can be designed to connect the bleed outlet and/or the bleed line to the second pressure chamber of the pressure-providing device in one position, for example a rearward position, such as an end position. The piston of the pressure-providing device can have a connecting channel. The connecting channel can run and/or be formed within the piston of the pressure-providing device. The connecting channel can be designed to connect the bleed outlet and/or the bleed line to the at least one or to the second pressure chamber of the pressure-providing device.

The hydraulic arrangement can have at least one, for example switchable, three-way valve. The hydraulic arrangement can have a primary three-way valve. The hydraulic arrangement can have a secondary three-way valve. The primary three-way valve and/or the secondary three-way valve can be switchable three-way valves and/or can be designed to be switchable. The primary three-way valve and/or the secondary three-way valve can be base valves and/or changeover valves. The primary three-way valve and/or the secondary three-way valve can be designed to be electromagnetically actuable. The primary three-way valve and/or the secondary three-way valve can be designed to be operable in up to three positions.

The first and/or second pressure chamber of the pressure-providing device can be connected via a line to the primary three-way valve and/or the secondary three-way valve. The primary three-way valve and/or the secondary three-way valve can have a first channel, which is connected via a line to the first and/or second pressure chamber of the pressure-providing device.

The second pressure chamber of the piston-cylinder arrangement can be connected via a line to the secondary three-way valve. The secondary three-way valve can have a second channel, which is connected via a line to the second pressure chamber of the piston-cylinder arrangement. The first pressure chamber of the piston-cylinder arrangement can be connected via a line to the primary three-way valve. The primary three-way valve can have a second channel, which is connected via a line to the first pressure chamber of the piston-cylinder arrangement and/or to a pedal simulator arrangement.

The primary three-way valve and/or the secondary three-way valve can have a third channel, which is connected via a line to the at least one wheel brake or the wheel brakes.

The primary three-way valve and/or the secondary three-way valve can be designed, in a first position for example, to connect the first and/or second channel to the third channel. The primary three-way valve and/or the secondary three-way valve can be designed, in a second position for example, to connect the first to the third channel and/or to block the second channel. The primary three-way valve and/or the secondary three-way valve can be designed to switch between the first and second positions. The primary three-way valve and/or the secondary three-way valve can have sections which allow the pressure medium to pass in one or both directions and/or sections which block the pressure medium and/or sections which allow the pressure medium to pass in only one direction. The primary three-way valve and/or the secondary three-way valve can have a non-return valve. The primary three-way valve and/or the secondary three-way valve can be designed to switch between the sections.

The hydraulic arrangement can be a pedal simulator arrangement. The pedal simulator arrangement can be and/or have a simulator, such as a pedal simulator. The pedal simulator arrangement can have a spring-piston device. The pedal simulator arrangement can have a pressure chamber. The pressure chamber of the pedal simulator arrangement can be delimited by the piston of the spring-piston device. The pedal simulator arrangement can have a simulator valve, e.g. a switchable simulator valve. The simulator valve can be designed to be electromagnetically actuable. The simulator valve can be designed to switch between two positions. The pedal simulator arrangement can be connected via a line to the primary three-way valve or its second channel and/or to the first pressure chamber of the piston-cylinder arrangement. The simulator valve can be arranged in this line.

The hydraulic arrangement can have a plurality of pressure application valves, e.g. switchable pressure application valves. The hydraulic arrangement can have a plurality of discharge valves, e.g. switchable discharge valves. Braking operations, such as, for example, ABS, driving stability control processes, traction control processes or the like, can be controlled by the pressure application valves and/or discharge valves. The pressure application valves and/or discharge valves can be connected via lines to the wheel brakes and/or can feed pressure medium to the wheel brakes. Each wheel brake can be assigned a pressure application valve and/or a discharge valve, or each wheel brake can be connected to a pressure application valve and/or a discharge valve. The plurality of discharge valves can be connected via a line to the third partial reservoir or to the third reservoir line.

At least one pressure application valve can be connected via a line to the primary three-way valve or to its third channel. For example, two pressure application valves can be connected via the line to the primary three-way valve or to its third channel. At least one pressure application valve can be connected via a line to the secondary three-way valve or its third channel. For example, two pressure application valves can be connected via the line to the secondary three-way valve or its third channel. The hydraulic arrangement can have four pressure application valves and/or four discharge valves, for example. The primary three-way valve can be connected in terms of flow to a first wheel brake and a third wheel brake via respective pressure application valves. The secondary three-way valve can be connected in terms of flow to a second wheel brake and a fourth wheel brake via respective pressure application valves. The first wheel brake can be the front left wheel brake. The second wheel brake can be the front right wheel brake. The third wheel brake can be the rear right wheel brake. The fourth wheel brake can be the rear left wheel brake.

The hydraulic arrangement can have a pressure sensor, for example a master cylinder primary pressure sensor, for detecting a pressure present in the line connecting the first pressure chamber of the piston-cylinder arrangement and the primary three-way valve or the second channel thereof.

A diagnostic method can be used and/or be for identifying a leak in a valve, such as a checking valve and/or non-return valve. The valve can be arranged in a bleed line of a hydraulic arrangement of a brake system, for example of a vehicle. The hydraulic arrangement and/or the valve and/or the bleed line and/or the brake system can be designed and/or activated as described above and/or below.

The diagnostic method can comprise the step of: deactivating, e.g. deenergizing, a plurality of pressure application valves. The pressure application valves can be designed and/or activated as described above and/or below.

The diagnostic method can comprise the step of: activating, e.g. energizing, a primary three-way valve to hold and/or enclose a pressure medium, such as hydraulic fluid and/or brake fluid, in a pressure chamber, e.g. a first pressure chamber, of a piston-cylinder arrangement. The pressure chamber of the piston-cylinder arrangement can be delimited by a piston, such as a first piston and/or input piston, which can be adjusted by means of an actuating device, for example a brake pedal device. The piston-cylinder arrangement and/or the actuating device can be designed and/or activated as described above and/or below.

The diagnostic method can comprise the step of: applying pressure via a simulator piston of a pedal simulator arrangement in order to achieve a predetermined pressure level, e.g. in a line leading to the pressure chamber of the piston-cylinder arrangement and/or to the valve of the bleed line. The pedal simulator arrangement and/or the simulator piston thereof can be designed and/or activated as described above and/or below.

The step of applying a pressure can comprise actuating the pedal simulator arrangement, e.g. actuating the simulator piston of the pedal simulator arrangement, to exert the pressure. The step of applying a pressure can comprise moving the simulator piston into an extended position. The predetermined pressure level can be achieved on a suction side of the valve of the bleed line.

The diagnostic method can comprise the step of: connecting the bleed line to a booster circuit. The booster circuit can be the brake circuit or the brake circuit can comprise the booster circuit. The booster circuit can be designed and/or activated as described above and/or below.

The step of connecting the bleed line to the booster circuit can comprise connecting a blocking side of the valve of the bleed line to the booster circuit. The step of connecting the bleed line to the booster circuit can comprise actuating a pressure-providing device, for example moving a piston of the pressure-providing device within at least one pressure chamber of the pressure-providing device, wherein the at least one pressure chamber is connected to a brake circuit. The piston of the pressure-providing device can be moved into a home position and/or retracted position, in which the bleed line is connected to the booster circuit and/or brake circuit, e.g. via a connecting channel in the piston of the pressure-providing device. The step of connecting the bleed line to the booster circuit can comprise connecting the bleed line and/or the blocking side of the valve of the bleed line to the primary three-way valve or to its first channel and/or to the secondary three-way valve or to its first channel.

The diagnostic method can comprise the step of: identifying a leak in the valve of the bleed line if the pressure, e.g. in the line leading to the pressure chamber of the piston-cylinder arrangement and/or to the valve of the bleed line, falls below a predetermined pressure value.

The predetermined pressure level and/or the predetermined pressure value can be substantially 15 bar. The pressure can be detected, for example by a pressure sensor, such as a master cylinder primary pressure sensor, and/or compared to the predetermined pressure value. A leak in the valve of the bleed line can be identified if the detected pressure falls or has fallen below the predetermined pressure value and/or if no substantially constant pressure is present.

Before the step of deactivating the plurality of pressure application valves and/or activating the primary three-way valve, the piston-cylinder arrangement, e.g. the pressure chamber, such as the first pressure chamber, of the piston-cylinder arrangement, and/or the pedal simulator arrangement, can be pre-charged, for example, with pressure medium.

The pre-charging can be accomplished by actuating the pressure-providing device, for example by moving the piston of the pressure-providing device into an extended position. In the extended position of the piston of the pressure-providing device, the bleed line can be separated from the booster circuit and/or brake circuit.

Before the pre-charging step, the primary three-way valve can be deactivated, e.g. de-energized, in order to connect the pressure-providing device, for example hydraulically, to the piston-cylinder arrangement, for example, to its pressure chamber, such as the first pressure chamber.

Before the pre-charging step, the plurality of pressure application valves and/or the secondary three-way valve and/or a simulator valve and/or a simulator test valve can be activated, e.g. energized.

A brake system can be used or be for a vehicle, such as a motor vehicle. The motor vehicle can be a passenger car or a heavy goods vehicle. The brake system can be a vehicle brake system and/or a motor vehicle brake system. The brake system can be designed and/or operated as described above and/or below. The brake system can have a hydraulic arrangement. The hydraulic arrangement can be designed and/or operated as described above and/or below. The brake system and/or the hydraulic arrangement can be designed and/or set up to carry out a diagnostic method. The diagnostic method can be the diagnostic method described above and/or below. The brake system can have a control device for this purpose. The control unit can have an electronic controller. The control unit can be an electronic control unit (ECU).

A computer program can comprise a program code in order, when the computer program is executed on a processor, to execute the diagnostic method described above and/or below, for example for identifying a leak in a valve, such as a checking valve and/or non-return valve, which is arranged in a bleed line of a hydraulic arrangement of a brake system. A computer program can make a device, such as an, for example electronic, controller and/or control and/or processing unit/device, a control system, a driver assistance system, a brake installation or brake system, such as a vehicle brake installation/system, a hydraulic arrangement and/or its, for example switchable, valves and/or actuators, a processor or a computer, carry out the diagnostic method described above and/or below, for example for identifying a leak in a valve. For this purpose, the computer program product can have corresponding data records and/or a program code and/or the computer program.

In other words, a hydraulic arrangement for a testable bleed check valve to counter undetected leakage, and the associated test method, can be provided. The bleed path can be routed or arranged from the DAP cutoff to the T1 chamber path, between the simulator test valve and the master cylinder. In the event of a leakage, the DAP and the T3 reservoir can still have sufficient brake fluid to carry out braking. In order also to prevent draining of the T1 reservoir, a valve, such as a check valve (CV), can be integrated into the bleed path. This valve can be testable.

A test procedure or testing of the valve, such as a check valve, for tightness can be as follows: activate all pressure application valves (ABS-ISOs), the secondary three-way valve (secondary isolation valve), the simulator valve and the simulator test valve. The primary three-way valve (primary isolation valve) remains deactivated for the connection between the pressure-providing device (DAP) and the first pressure chamber of the piston-cylinder arrangement (primary master cylinder). The pedal unit including the brake master cylinder and pedal simulator arrangement (pedal force simulator) is pre-charged via the DAP. A pressure drop indicates leaking ABS-ISOs, secondary isolation valve or simulator test valve. The path via the cutoff with the DAP advanced is closed. There is thus no risk of confusion with a leaking CV. Deactivating the ABS ISOs and activating the primary isolation valves leads to the trapping of the volume in the pedal unit. Pressure is exerted by the pedal force simulator, with the expected pressure being about 15 bar. DAP moves back via the cutoff and opens the path from the CV to the system. A constant pressure (approx. 15 bar) is to be expected at the master cylinder primary pressure sensor, such as master cylinder pressure sensor (MCPS), if the CV is tight. If there is a leak at the CV, the pressure drops.

The disclosure provides an arrangement that allows for a testable measure against undetected loss of brake fluid in the event of leakage. The system can be more robust with respect to leakage. Continuous bleeding, for example while driving, can be accomplished. In the event of a leakage fault, draining of the brake fluid reservoir and/or of the pressure-providing device, such as a brake booster, can be prevented. The functionality of valves in the bleed path can be tested. Underbraking of the vehicle can be avoided.

BRIEF DESCRIPTION OF DRAWINGS

Exemplary arrangements of the disclosure are described in greater detail below with reference to figures, which are schematic and illustrative and of which.

DETAILED DESCRIPTION

Figure 1:
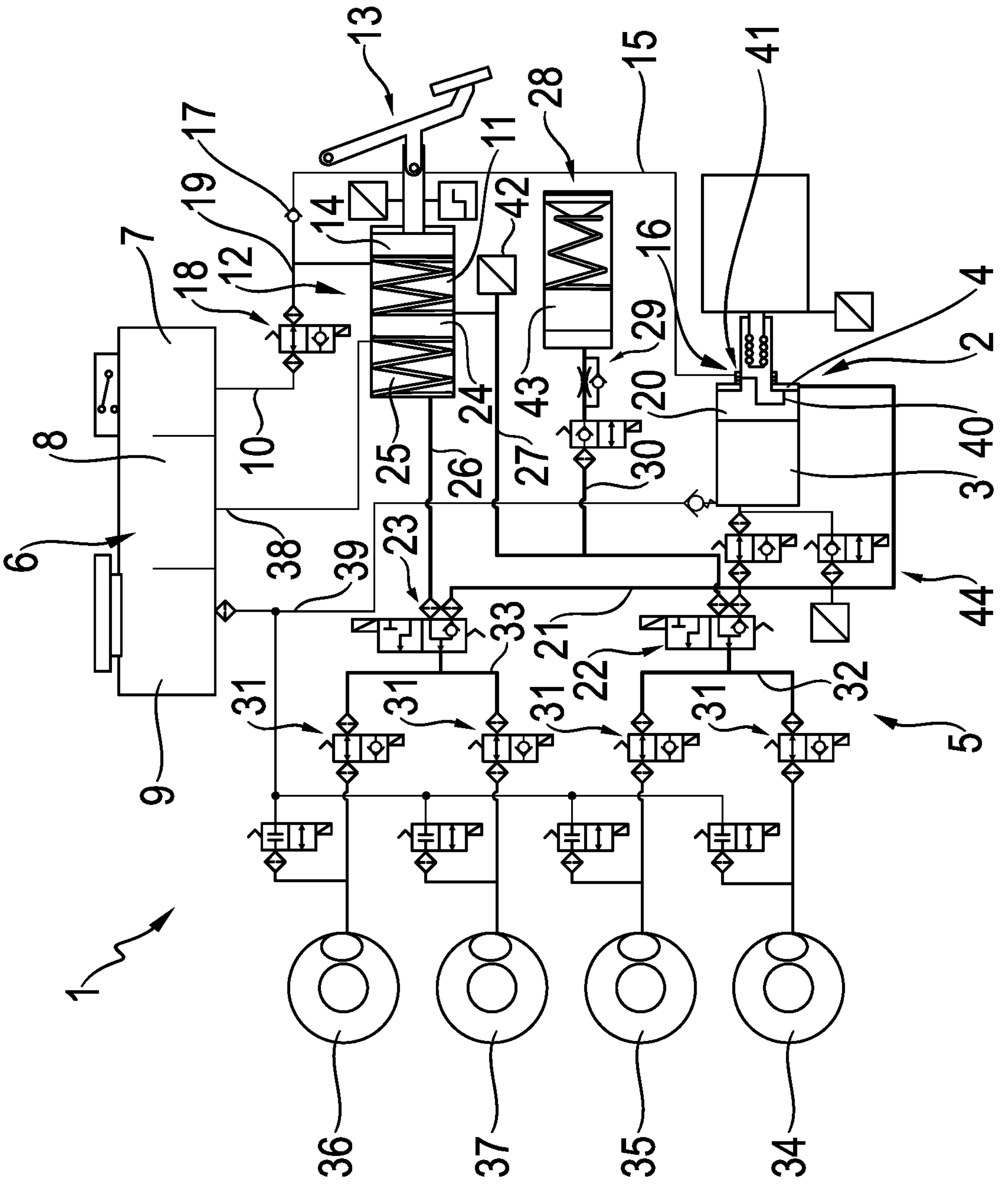
FIG. 1 shows a hydraulic arrangement for a brake system of a vehicle.

FIG. 1 shows schematically a hydraulic arrangement 1 for a brake system, for example a brake system of a vehicle. The hydraulic arrangement 1 has a pressure-providing device 2

(DAP) with at least one pressure chamber, in this exemplary arrangement, a first pressure chamber 3 and a second pressure chamber 4, which can be connected to a brake circuit 5. The hydraulic arrangement 1 furthermore has a reservoir 6 for storing a pressure medium, such as hydraulic fluid and/or brake fluid. The reservoir 6 has a first partial reservoir 7, a second partial reservoir 8 and a third partial reservoir 9. The first partial reservoir 7 is connected via a first reservoir line 10 to a first pressure chamber 11 of a piston-cylinder arrangement 12. The first pressure chamber 11 of the piston-cylinder arrangement 12 is delimited by a piston 14, such as an input piston 14, which is adjustable by an actuating device 13, in this case a brake pedal device 13. The hydraulic arrangement 1 has a bleed line 15, which connects a bleed outlet 16 of the pressure-providing device 2 to the first reservoir line 10.

A valve 17, for example a checking and/or non-return valve, is arranged in the bleed line 15 and is designed as a non-return valve, the suction side of which is connected in the direction of the first reservoir line 10 and the blocking side of which is connected in the direction of the bleed outlet 16. The hydraulic arrangement 1 furthermore has a switchable simulator test valve 18, which is arranged in the first reservoir line 10. The bleed line 15 opens into a section 19 of the first reservoir line 10 which is arranged between the simulator test valve 18 and the first pressure chamber 11 of the piston-cylinder arrangement 12.

The pressure-providing device 2 has a piston 20, which is designed to connect the bleed outlet 16 and the bleed line 15 to the second pressure chamber 4 of the pressure-providing device 2 in one position, in one exemplary arrangement, a rearward position, such as an end position. The piston 20 of the pressure-providing device 2 separates the first pressure chamber 3 and the second pressure chamber 4 from one another. The first pressure chamber 3 and the second pressure chamber 4 of the pressure-providing device 2 are connected via a line 21 to a switchable primary three-way valve 22 and a switchable secondary three-way valve 23 of the brake circuit 5.

The piston-cylinder arrangement 12 furthermore has an output piston 24, wherein the first pressure chamber 11 of the piston-cylinder arrangement 12 is delimited by the input piston 14 and the output piston 24. The piston-cylinder arrangement 12 has a second pressure chamber 25 delimited by the output piston 12, wherein the second pressure chamber 25 of the piston-cylinder arrangement 12 is connected via a line 26 to the secondary three-way valve 23. The first pressure chamber 11 of the piston-cylinder arrangement 12 is connected via a line 27 to the primary three-way valve 22.

The hydraulic arrangement 1 furthermore has a pedal simulator arrangement 28 having a switchable simulator valve 29 and a simulator piston 43. The pedal simulator arrangement 28 is connected via a line 30 to the primary three-way valve 22 and to the first pressure chamber 11 of the piston-cylinder arrangement 12.

Furthermore, the hydraulic arrangement 1 has a plurality of switchable pressure application valves 31. At least one pressure application valve 31, in this case two pressure application valves 31, is/are connected via a line 32 to the primary three-way valve 22, and at least one pressure application valve 31, in this case two pressure application valves 31, is/are connected via a line 33 to the secondary three-way valve 23. The primary three-way valve 22 is connected in terms of flow to a first wheel brake 34 and a third wheel brake 35 via respective pressure application valves 31, and the secondary three-way valve 23 is connected in terms of flow to a second wheel brake 36 and a fourth wheel brake 37 via respective pressure application valves 31.

The second partial reservoir 8 of the reservoir 6 is connected via a second reservoir line 38 to the second pressure chamber 25 of the piston-cylinder arrangement 12, and the third partial reservoir 9 of the reservoir 6 is connected via a third reservoir line 39 to the first pressure chamber 3 of the pressure-providing device 2.

The piston 20 of the pressure-providing device 2 has a connecting channel 40. The connecting channel 40 is designed to connect the bleed outlet 16 and the bleed line 15 to the at least one or to the second pressure chamber 4 of the pressure-providing device 2. The bleed outlet 16 is arranged between two seals 41, which are in engagement with the cylindrical outer surface of the piston 20 of the pressure-providing device 2.

Furthermore, the hydraulic arrangement 1 has a pressure sensor 42 for example, a master cylinder primary pressure sensor 42, for detecting a pressure present in the line 27 connecting the first pressure chamber 11 of the piston-cylinder arrangement 12 and the primary three-way valve 22.

Figure 2:
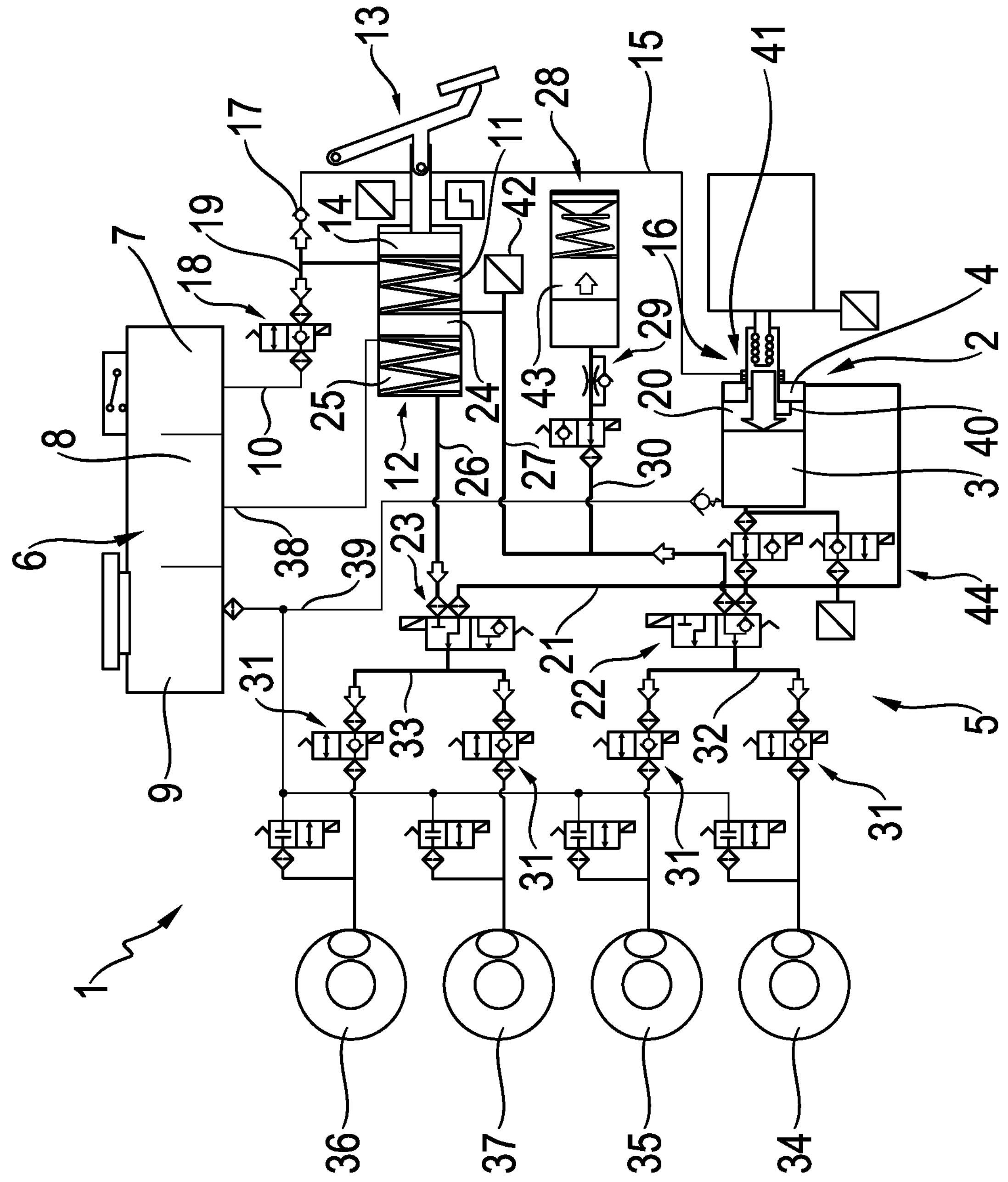
FIG. 2 shows the hydraulic arrangement according to FIG. 1 in an exemplary configuration for pre-charging the system.
Figure 3:
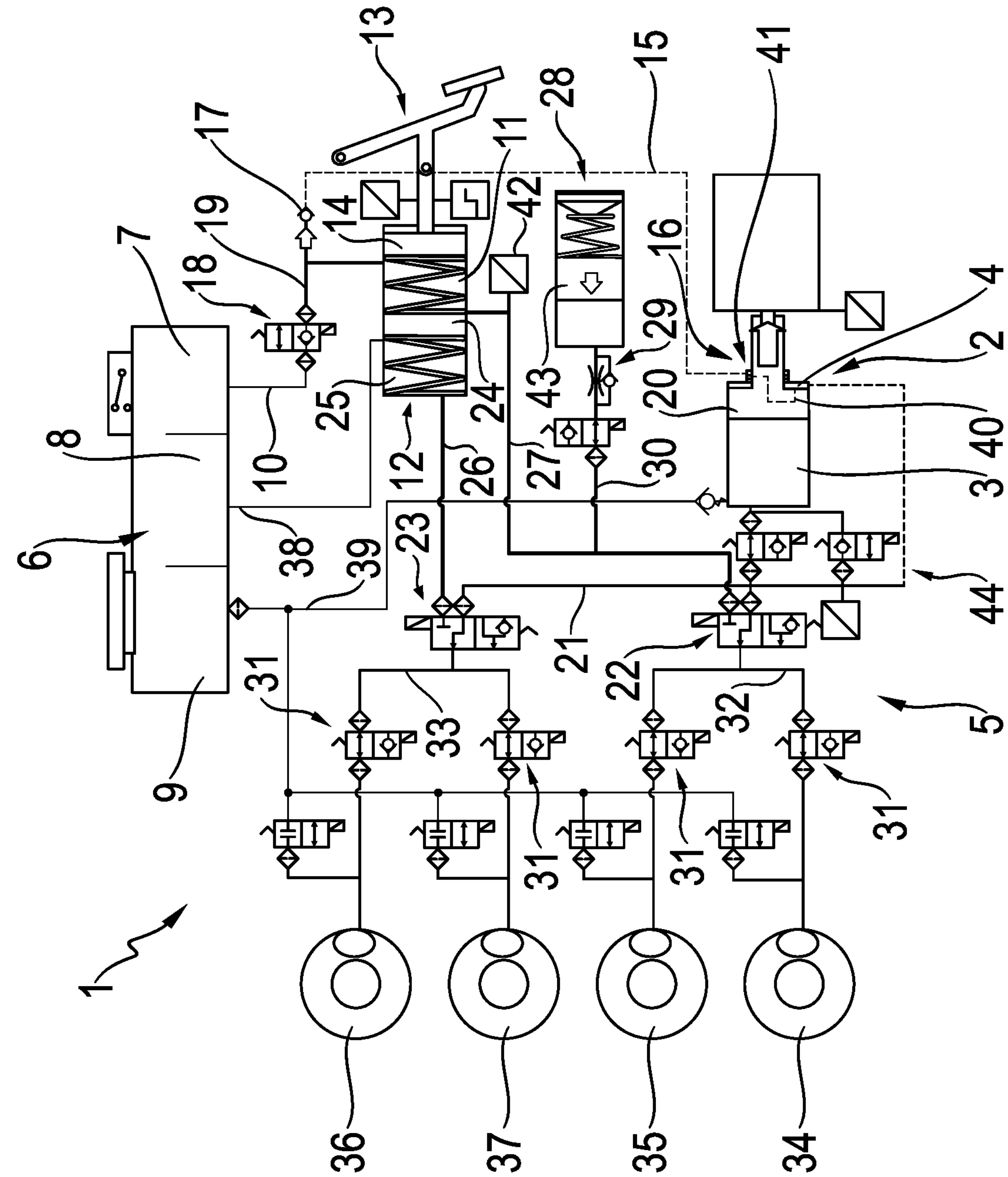
FIG. 3 shows the hydraulic arrangement according to FIG. 1 in an exemplary configuration for testing the tightness of the valve in the bleed line.

FIGS. 2 and 3 schematically show the hydraulic arrangement 1 described with reference to FIG. 1 in a configuration for pre-charging the system (FIG. 2) and in a configuration for testing a tightness of the valve 17 in the bleed line 15 (FIG. 3). The arrows shown in FIGS. 2 and 3 illustrate the direction of flow and/or direction of pressure of the pressure medium and the direction of movement of the pistons.

A diagnostic method for identifying a leak in the valve 17, such as a checking valve and/or a non-return valve which is arranged in the bleed line 15 of the hydraulic arrangement 1 can comprise the step of: deactivating, in particular deenergizing, the plurality of pressure application valves 31. The pressure application valves 31 then assume the state shown in FIG. 3.

The diagnostic method may further comprise a step of: activating, in one exemplary arrangement, energizing, the primary three-way valve 22 to hold and/or enclose the pressure medium, such as hydraulic fluid and/or brake fluid, in the first pressure chamber 11 of the piston-cylinder arrangement 12. The primary three-way valve 22 then assumes the state shown in FIG. 3.

The diagnostic method may further comprise a step of: applying pressure via the simulator piston 43 of the pedal simulator arrangement 28 in order to achieve a predetermined pressure level, for example in a line 27 leading to the pressure chamber 11 of the piston-cylinder arrangement 12 and to the valve 17 of the bleed line 15. The step of applying a pressure comprises actuating the pedal simulator arrangement 28, in particular actuating the simulator piston 43 of the pedal simulator arrangement 28, to exert the pressure. During this process, the simulator piston 43 is moved into an extended position. This is illustrated schematically by the arrows in FIG. 3. The predetermined pressure level is achieved on the suction side of the valve 17 of the bleed line 15.

The diagnostic method may further comprise a step of: connecting the bleed line 15 to a booster circuit 44 and/or brake circuit 5. The step of connecting the bleed line 15 to the booster circuit 44 and/or the brake circuit 5 comprises connecting the blocking side of the valve 17 of the bleed line 15 to the booster circuit 44 and/or the brake circuit 5. During this process, the pressure-providing device 2 is actuated, for example, the piston 20 of the pressure-providing device 2 is moved within the pressure chamber of the pressure-providing device 2, wherein the pressure chamber is connected to the booster circuit 44 and/or brake circuit 5. During this process, the piston 20 of the pressure-providing device 2 is moved into a home position and/or retracted position, in which the bleed line 15 is connected to the booster circuit 44 and/or brake circuit 5, for example via the connecting channel 40 in the piston 20 of the pressure-providing device 2. This is illustrated schematically by the arrow in FIG. 3.

The diagnostic method may further comprise the step of: identifying a leak in the valve 17 of the bleed line 15 if the pressure, for example in the line 27 leading to the first pressure chamber 11 of the piston-cylinder arrangement 12 and to the valve 17 of the bleed line 15, falls below a predetermined pressure value. The predetermined pressure level and/or the predetermined pressure value can be substantially 15 bar. The pressure is detected and compared with the predetermined pressure value by the pressure sensor 42, such as a master cylinder primary pressure sensor, and a leak in the valve 17 of the bleed line 15 is identified if the detected pressure falls below the predetermined pressure value.

Before the step of deactivating the plurality of pressure application valves 31 and before activating the primary three-way valve, the piston-cylinder arrangement 12, for example, the first pressure chamber 11 of the piston-cylinder arrangement 12 and the pedal simulator arrangement 28, is pre-charged, in particular with pressure medium (cf. FIG. 2).

Pre-charging is accomplished by actuation of the pressure-providing device 2, for example by movement of the piston 20 of the pressure-providing device 2 into an extended position, wherein, in the extended position of the piston 20 of the pressure-providing device 2, the bleed line 15 is separated from the booster circuit 44 and/or brake circuit 5. This is illustrated schematically by the arrows in FIG. 2.

Before the pre-charging step, the primary three-way valve 22 is deactivated, in particular de-energized, for the purpose of connecting, for example hydraulically, the pressure-providing device 2 to the piston-cylinder arrangement 12, for example to the first pressure chamber 11 thereof. The primary three-way valve 22 then assumes the state shown in FIG. 2.

Furthermore, before the pre-charging step, the plurality of pressure application valves 31, the secondary three-way valve 23, the simulator valve 29 and the simulator test valve 18 are activated, for example, energized. These valves then assume the state shown in FIG. 2.

In other respects, reference is additionally made, in particular, to FIG. 1 and the associated description.

"Can" denotes optional features of the disclosure. Accordingly, there are also developments and/or exemplary arrangements of the disclosure that have the respective feature or features in addition or as an alternative.

If required, isolated features can also be selected from the combinations of features disclosed here and, breaking up a structural and/or functional relationship which may exist between said features, can be used in combination with other features to delimit the subject matter of a claim. The sequence and/or number of steps of the method can be varied.

The invention claimed is:

1. A hydraulic arrangement for a brake system, comprising a pressure-providing device having at least one pressure chamber which can be connected to a brake circuit;

a reservoir for storing a pressure medium, wherein the reservoir has a first partial reservoir, which can be connected via a first reservoir line to a first pressure chamber of a piston-cylinder arrangement, wherein the first pressure chamber of the piston-cylinder arrangement is delimited by a piston, which can be adjusted by an actuating device; and a bleed line, which connects a bleed outlet of the pressure-providing device to the first reservoir line, wherein the pressure-providing device has a piston which is designed to connect the bleed outlet and/or the bleed line to the at least one pressure chamber of the pressure-providing device in one position, wherein the pressure-providing device has a first pressure chamber and a second pressure chamber, wherein the piston of the pressure-providing device separates the first pressure chamber and the second pressure chamber from one another, and wherein the piston is designed to connect the bleed outlet and/or the bleed line to the second pressure chamber of the pressure-providing device in a rearward position, wherein the first and/or second pressure chamber of the pressure-providing device is or are connected via a line to a primary three-way valve, and to a secondary three-way valve, of the brake circuit.

2. The hydraulic arrangement according to claim 1, wherein a valve, is arranged in the bleed line.

3. The hydraulic arrangement according to claim 2, wherein the valve is a non-return valve, a suction side of which is connected in a direction of the first reservoir line and a blocking side of which is connected in a direction of the bleed outlet.

4. The hydraulic arrangement according to claim 1, wherein the hydraulic arrangement has a switchable valve, which is arranged in the first reservoir line, wherein the bleed line opens into a section of the first reservoir line which is arranged between the switchable valve and the first pressure chamber of the piston-cylinder arrangement.

5. The hydraulic arrangement according to claim 1, wherein the piston of the pressure-providing device has a connecting channel, which is designed to connect the bleed outlet and/or the bleed line to the at least one or to the second pressure chamber of the pressure-providing device.

6. The hydraulic arrangement according to claim 5, wherein the bleed outlet is arranged between two seals, which are in engagement with the cylindrical outer surface of the piston of the pressure-providing device.

7. The hydraulic arrangement according to claim 1, wherein the piston-cylinder arrangement has a second pressure chamber delimited by an output piston, wherein the second pressure chamber of the piston-cylinder arrangement is connected via a line to the secondary three-way valve, and/or in that the first pressure chamber of the piston-cylinder arrangement is connected via a line to the primary three-way valve.

8. The hydraulic arrangement according to claim 1, wherein the hydraulic arrangement has a pedal simulator arrangement having a simulator valve, wherein the pedal simulator arrangement is connected via a line to the primary three-way valve and/or to the first pressure chamber of the piston-cylinder arrangement.

9. The hydraulic arrangement according to claim 1, wherein the hydraulic arrangement has a plurality of pressure application valves, wherein at least one pressure application valve is connected via a line to the primary three-way valve, and/or at least one pressure application valve is connected via a line to the secondary three-way valve.

10. The hydraulic arrangement according to claim 1, wherein the primary three-way valve is connected in terms of flow to a first wheel brake and a third wheel brake via respective pressure application valves, and/or the secondary three-way valve is connected in terms of flow to a second wheel brake and a fourth wheel brake via respective pressure application valves.

11. The hydraulic arrangement according to claim 1, wherein the reservoir has a second partial reservoir, which is connected via a second reservoir line to the second pressure chamber of the piston-cylinder arrangement, and/or the reservoir has a third partial reservoir, which can be connected via a third reservoir line to the first pressure chamber of the pressure-providing device.

12. The hydraulic arrangement according to claim 1, wherein the hydraulic arrangement has a pressure sensor, for detecting a pressure present in the line connecting the first pressure chamber of the piston-cylinder arrangement and the primary three-way valve.

* * * * *